(12) United States Patent
Podanoffsky

(10) Patent No.: US 6,735,716 B1
(45) Date of Patent: *May 11, 2004

(54) COMPUTERIZED DIAGNOSTICS AND FAILURE RECOVERY

(75) Inventor: Michael Podanoffsky, Hudson, NH (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,397

(22) Filed: Sep. 27, 1999

(51) Int. Cl.[7] ................................................. G06F 11/00
(52) U.S. Cl. ............................................. 714/10; 714/15
(58) Field of Search ........................... 714/10, 15, 16, 714/31, 39, 47, 55; 702/188

(56) References Cited

U.S. PATENT DOCUMENTS

| | | | | |
|---|---|---|---|---|
| 4,597,052 A | * | 6/1986 | Matsuda ..................... 364/550 |
| 4,635,258 A | * | 1/1987 | Salowe ........................ 371/16 |
| 5,179,695 A | * | 1/1993 | Derr et al. ................... 395/575 |
| 5,546,452 A | | 8/1996 | Andrews et al. ............. 379/219 |
| 5,630,047 A | * | 5/1997 | Wang ..................... 395/182.13 |
| 5,652,833 A | * | 7/1997 | Takizawa et al. ...... 395/182.08 |
| 5,748,882 A | * | 5/1998 | Huang ......................... 714/47 |
| 5,815,651 A | * | 9/1998 | Litt ......................... 395/182.08 |
| 5,878,130 A | | 3/1999 | Andrews et al. ............. 379/265 |
| 5,956,474 A | * | 9/1999 | Bissett et al. .......... 395/182.09 |
| 6,115,830 A | * | 9/2000 | Zabarsky et al. ............. 714/15 |
| 6,202,174 B1 | * | 3/2001 | Lee et al. ..................... 714/38 |
| 6,219,719 B1 | * | 4/2001 | Graf ............................. 710/1 |
| 6,351,823 B1 | * | 2/2002 | Mayer et al. ................. 714/10 |

OTHER PUBLICATIONS

Microsoft Corporation, Microsoft Component Services: Server Operating System A Technology Overview, Aug. 15, 1998, pp. 1–7.
Microsoft Corproation, DCOM Technical Overview, Nov. 1996, pp. 1–27.
Markus Horstmann and Mary Kirtland, DCOM Architecture, Jul. 23, 1997 pp. 1–44.
Horstmann et al., *DCOM Architecture*, Jul. 23, 1997, pp. 1–54.
Williams et al., *The Component Object Model: A Technical Overview*, Oct., 1994, pp. 1–21.

* cited by examiner

Primary Examiner—Robert Beausoliel
Assistant Examiner—Marc Duncan
(74) Attorney, Agent, or Firm—Cesari and McKenna, LLP

(57) ABSTRACT

Computerized diagnostic and failure recovery techniques are provided. The techniques of the present invention permit a component object model (COM) server process failure to be determined and corrected, and notification of same to be provided to a COM client process, more quickly and efficiently than is possible in the prior art. Also, the techniques of the present invention permit COM server and client processes to resume normal interaction, after the COM server process has been terminated and newly instantiated, more quickly and efficiently than is possible in the prior art.

32 Claims, 2 Drawing Sheets

COMPUTERIZED DIAGNOSTICS AND FAILURE RECOVERY

BACKGROUND OF THE INVENTION

1. Field of the Invention

The present invention relates generally to computerized diagnostic and failure recovery techniques, and more specifically, to such techniques wherein a first computer process is monitored by a second computer process for occurrence of a failure condition, and the second process takes appropriate action when and if the failure condition occurs. As will be appreciated by those skilled in the art, although the present invention will be described in connection with specific embodiments and methods of use wherein the first process is a component object model (COM) server process, the present invention finds utility in diagnostics and failure recovery of processes other than COM processes. Thus, the present invention should not be viewed as being limited to use in diagnostics and failure recovery of COM processes, but rather should be viewed broadly as being limited only as set forth in the hereinafter appended claims.

2. Brief Description of Related Prior Art

The component object model (COM) is a software component architecture standard promulgated by Microsoft Corporation of Redmond, Wash. that allows applications and systems to be constructed using software components supplied by different software suppliers. The COM architecture permits higher level software components to exchange data with each other according to a well-defined protocol.

The specifics of the COM architecture are well known to those skilled in the art, and provide a programming language-independent and computer platform-independent standard for software component interoperability. More specifically, the COM architecture provides respective standards for software components executed on respective computer platforms that define how the components initialize and use virtual function tables to call functions supported by the software components via the function pointers in the tables. This standardizes the way in which components interoperate with other components when they call such functions.

In the COM architecture, an executing process that provides or uses a service may be called an "object." Objects interact with each other via "interfaces." In essence, a COM object interface provides and defines one or more related operations or functions ("methods") provided by the object, and behaviors and responsibilities associated with these methods. An object accesses an interface of another object by utilizing a function pointer to that interface. A "server" object makes available one or more of its methods to a "client" object. That is, a client object accesses an interface of a server object to utilize one or more methods provided by that interface. The client object and the server object may each be separate computer processes, or alternatively, may be comprised in the same process.

According to the COM architecture, each and every interface has a respective, unique interface identifier associated with it. These interface identifiers are referred to as globally unique identifiers (GUID). When a client object wishes to discover whether or not a particular interface is supported by a server object, the client object calls a special method that is supported by all components, called QueryInterface. The result of calling this special method is either a return from the server object of the appropriate interface pointer and a success code, if the server object being queried supports that interface, or conversely, if the server object being queried does not support that interface, the server object returns an error value to the client object.

Further, in accordance with the COM architecture, when client and server objects are in different processes, proxy and stub intermediate objects are created which exchange data between the processes. More specifically, when the QueryInterface method returns a success code to the client object, and the client and server objects are in different processes, a proxy object is created in the client object and an associated stub object. is created in the server object.

There are a number of ways in which a server object may fail (i.e., experience a failure condition in its operation/execution, such as, becoming unresponsive to interface access requests from client objects). Examples of events that can cause a server object to fail include the experiencing by the server object of an untrapped exception or becoming deadlocked in its execution. When such a failure condition occurs in operation of the server object, if a client object and server object are comprised in different respective processes, a call made by the client object to a server object interface will be ineffective to call methods of that interface, and will instead result in return of an error message from the operating system to the client object. Typically, the client object may be programmed to take corrective action to return the server object to a normal operating mode (e.g., by issuing appropriate requests to the operating system that the operating system terminate and restart the server object), if the client object receives a predetermined number of such error messages in a predetermined time period.

Typically, after the server object has failed, a time period of several seconds may occur between the issuing of an interface call and the return of an error message to the client object from the operating system. Thus, since the client object typically will not take corrective action to return the server object to a normal operating mode unless the client object has received in the predetermined time period multiple error messages from the operating system, there may be a significant time lapse between failure of the server object and the taking of such corrective action by the client object. Disadvantageously, the significant time lapse that may exist between failure of a server object and the taking of corrective action by the client object introduces significant inefficiencies into the interactions between the client and server objects, and may reduce the processing efficiency of the computer system. If multiple client objects are involved, these inefficiencies may be further exacerbated.

SUMMARY OF THE INVENTION

In accordance with the present invention, computerized diagnostic and failure recovery techniques are provided that are able to overcome the aforesaid and other disadvantages and drawbacks of the prior art. More specifically, in one aspect of the present invention, a diagnostic and failure recovery technique is provided in which a first computer process (e.g., a COM server object process) requests that a second computer process monitor the first process for occurrence of a failure condition in operation of the first process. The second process initiates, if the second process determines that the failure condition has occurred, corrective action to return the first process to a normal operating mode.

In a second aspect of the present invention a technique is provided that may be practiced separately or in combination with the technique of the first aspect of the present invention. In the technique of the second aspect of the present invention, the first computer process requests that the second computer process monitor the first process for occurrence of a failure condition in operation of the first process. The second process provides to a third computer process (e.g., a COM client object process) an indication as to whether the failure condition has occurred. The second process may provide this indication to the third process in response to a request for such indication from a special proxy object in the third process. The proxy object may also detect and correct a pointer to the first process made invalid due to a failure and subsequent recovery of the first process.

The corrective action that may be taken by the second process in the technique of the first aspect of the present invention may comprise terminating and restarting the first process (e.g., via issuance of appropriate requests to an operating system process). Additionally, the second process may provide the first process with data that enables the first process to change its current internal state after having been terminated and restarted to a normal internal state that existed prior to the occurrence of the failure condition. The provision of this data to the first process by the second process may be initiated by the transmission to the second process from the first process of an identification code that uniquely identifies the data.

The unique identification code may have been first provided by the second process to the first process after termination and restart of the first process. The data transmitted to the first process that permits the first process to return to the normal internal state that existed prior to occurrence of the failure condition may have been provided to the second process by the first process prior to occurrence of the failure condition. When the first process receives this data, the first process may verify the validity of the data prior to using it to change its internal state.

In the technique of the second aspect of the present invention, if the second process determines that the failure condition has occurred, the second process may initiate corrective action to return the first process to a normal operating mode, which corrective action may comprise terminating and restarting the first process. The second process may determine whether the failure condition has occurred based at least upon whether the second process has received a message from the first process within a predetermined time period. The predetermined time period may be specified in a message from the first process to the second process that requested that the second process monitor the first process for occurrence of the failure condition. After issuing this request message, the first process may provide to the second process, so long as the failure condition has not occurred, periodic messages (e.g., method calls) indicating that the failure condition has not occurred.

Thus, in accordance with the present invention, a first process (which may be a COM server object process) may be monitored by a second process for occurrence of a failure condition in operation of the first process. If the second process determines that such a failure condition has occurred, the second process may take appropriate corrective action to return the first process to a normal operating mode and internal state that existed prior to the occurrence of the failure condition. Alternatively, or in addition thereto, the second process may signal or notify a third process (e.g., a client object process) that the failure condition has occurred. This permits the third process to correct invalid pointers to the first process.

Thus, advantageously, the techniques of the present invention permit a COM server process failure to be determined and corrected, and notification of same to be provided to a COM client process, more quickly and efficiently than is possible in the prior art. Also, by utilizing the techniques of the present invention, interaction between such server and client processes and computer system processing may be substantially more efficient than in the prior art.

These and other features and advantages of the present invention will become apparent as the following Detailed Description proceeds and upon reference to the drawings, wherein like numerals depict like parts, and in which:

Although the following Detailed Description will proceed with reference being made to particular embodiments and methods of use of the present invention, it should be appreciated that the present invention is not limited to these embodiments and methods of use. Rather, as will be appreciated by those skilled in the art, many alternatives, variations, and modifications thereof are possible without departing from the present invention. Accordingly, it is intended that the present invention be viewed broadly, as encompassing all such alternatives, variations, and modifications, and as being limited only as defined in the hereinafter appended claims.

DETAILED DESCRIPTION OF ILLUSTRATIVE EMBODIMENTS

Figure 1:
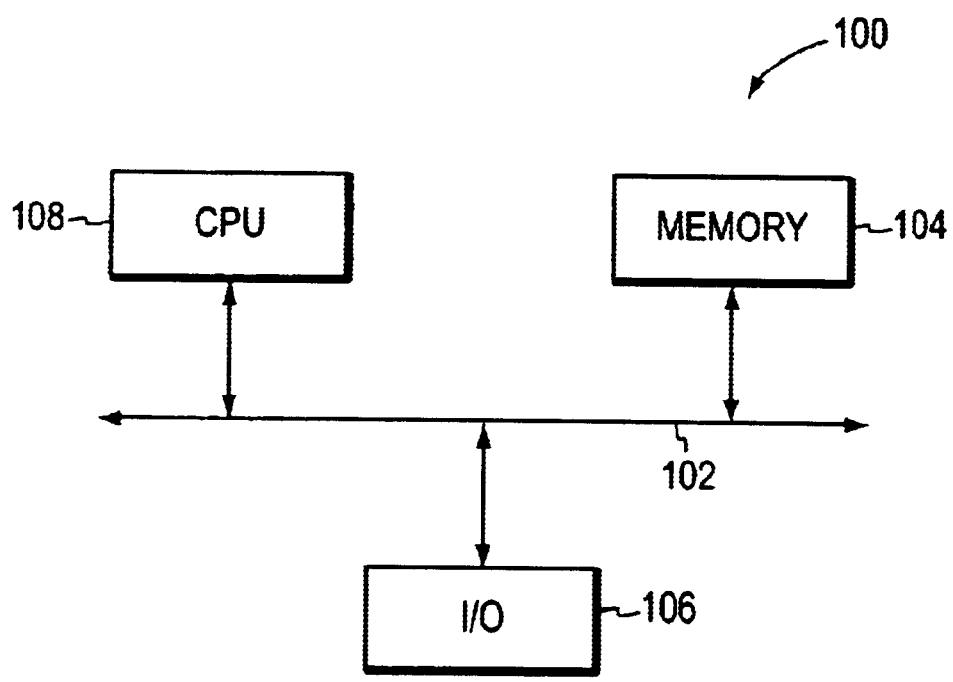
FIG. 1 is a highly schematic block diagram of a computer system wherein embodiments of the techniques of the present invention may be practiced to advantage.
Figure 2:
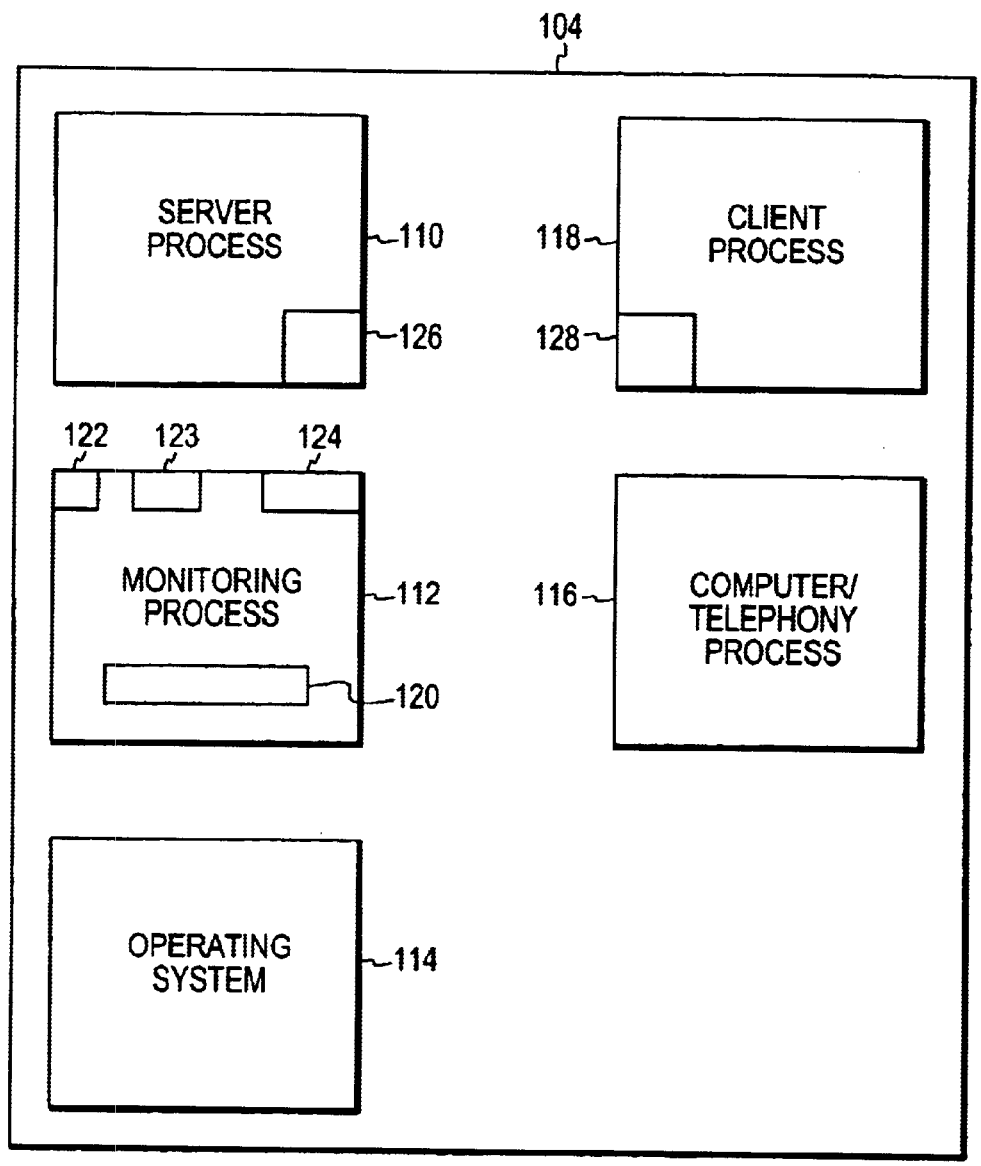
FIG. 2 is a highly schematic block diagram illustrating processes that reside in memory in the computer system of FIG. 1, which processes are used to implement embodiments of the techniques of the present invention.

With reference being made to FIGS. 1 and 2, a computer system 100, wherein embodiments of the present invention may be advantageously practiced, will now be described. As is shown in FIG. 1, system 100 comprises computer readable memory 104 for storing software programs, algorithms, and data structures associated with, and for carrying out, the various processes which reside in memory 104 and implement embodiments of the techniques of the present invention, and related and other methods and techniques described herein. In addition, system 100 further includes central processing unit 108 (e.g., an Intel 80×86™ microprocessor) for executing these software programs and algorithms, and for manipulating the stored data structures, to enable system 100 to carry out these methods and techniques. System 100 may also include a conventional input/output interface 106 (e.g., comprising keyboard, pointing device, display terminal, etc.) for permitting a user to control and interact with the system 100. Interface 106 optionally may also include networking and/or computer telephony interface hardware that permit system 100 to be networked with other computer systems (not shown) as part of a wide area or local area network communication system. The central processing unit 108, memory 104, and interface 106 are interconnected by a system bus 102.

In operation, a COM server object process and associated executable program instructions 110 reside in memory 104. A COM client object process and associated executable program instructions 118 also reside in memory 104. Except as specifically stated herein to the contrary, processes 110 and 118 interact with each other and operating system processes 114, in accordance with well known, conventional COM protocols.

Computer telephony processes 116 optionally may also reside in memory 104. Depending upon the application to which system 100 is intended to be put, these processes 116 may interact with processes 110, 118 to facilitate use of system 100 as part of a communications system of the type described in U.S. Pat. No. 5,887,130, entitled "Communications System and Method for Operating Same," issued on Mar. 2, 1999 and assigned to the Assignee of the subject application. When system 100 is put to such use, processes 110 and 118 may be call processing-related processes that utilize the networking and/or telephony hardware in interface 106 to facilitate such use. Of course, if appropriately modified in ways apparent to those skilled in the art, system 100 may be put to uses other than as part of such a communication system, without departing from the present invention, and when system 100 is put to such other uses, processes 116 may be replaced by other processes associated with such other uses or omitted altogether, and similarly, processes 110, 118 may have functions suited for such other uses.

Monitoring process 112, one or more operating system processes 114, and their respective associated executable instructions, also reside in memory 104. Process 112 is COM object process that maintains at least three different types of interfaces. One of the three types of interfaces is an "IServerMonitor" interface (hereinafter termed a "server interface"), an "IClientMonitor" interface (hereinafter termed a "client interface"), and an "IStore" interface (hereinafter termed a "data storage interface"). Each of these three types of interfaces includes a respective plurality of methods that are used in system 100 to implement the techniques of this embodiment of the present invention. Only a server process (e.g., process 110) uses the methods of a server interface or data storage interface of process 112. Likewise, only a client process (e.g., process 118) uses the methods of a client interface of process 112. Also, in system 100, processes 110, 112, and 118 each reside in different respective memory spaces in memory 104.

In order to utilize the methods of a server interface of process 112, process 110 first must create a respective server interface 122 in process 112 that is to be accessed exclusively by process 110. Process 110 creates interface 122 by issuing a server interface QueryInterface request to process 112. In response, the process 112 creates the interface 122 that is to be exclusively accessed by process 110.

In order to utilize the methods of a data storage interface of process 112, process 110 first must create a respective data storage interface 123 in process 112. Process 110 creates interface 123 by issuing a data storage interface QueryInterface request to process 112. In response, process 112 creates the interface 123.

Similarly, in order to utilize the methods of a client interface of process 112, process 118 first must create a respective client interface 124 in process 112 that is to be accessed exclusively by process 118 to determine the current operational status (i.e., whether process 110 is in a normal operating state or has failed) of a respective server process (e.g., process 110). Process 118 creates interface 124 by issuing a client interface QueryInterface request to process 112. In response, process 112 creates the interface 124 that is to be exclusively accessed by process 118.

In accordance with these embodiments of the techniques of the present invention, after creating interface 122, process 110 requests that process 112 monitor process 110 for occurrence of a failure condition in operation of process 110. Process 110 makes this request by issuing a call (hereinafter referred to as a "monitoring request message" or ("MRM") to one of the methods of the interface 122 that triggers such monitoring by process 112. The MRM made to this method in interface 122 contains a notification interval parameter ("NIP") whose value is an integer and is set by the process 110. The purpose of this parameter is described more fully below.

After process 110 issues the MRM to process 112, process 110 periodically issues calls to another method in interface 122 (hereinafter "notification method"). These calls inform the monitoring process 112 that server process 110 is still functioning normally (i.e., that a failure condition in operation of process 110 has not occurred). The value of the NIP specifies the periodicity, in milliseconds, with which process 110 issues these calls, if process 110 is functioning normally.

When process 112 receives the MRM, the process 112 examines the value of the NIP. Process 112 then expects to receive from the process 110 periodic calls (i.e., with the periodicity specified in the NIP) to the notification method of interface 122. That is, after process 112 receives the MRM from process 110, so long as process 112 receives calls to the notification method of interface 122 with the periodicity specified by the NIP in the MRM, process 112 takes this to indicate that process 110 is functioning normally. Conversely, if, after process 112 receives the MRM, process 112 fails to receive any of these expected periodic calls to the notification method of interface 122, process 112 takes this to indicate that process 110 has failed, and takes corrective action (which will be described below) to restore process 110 to a normal operating mode.

While process 110 is functioning normally, process 110 periodically provides to process 112 via arguments in periodic calls to a method in interface 123 (hereinafter referred to as the "data storage method") data representative of the internal state of the process 110 (i.e., interfaces supported by the process 110, the values of important program values, data structures, etc.). When process 112 receives this data, process 112 stores the data in a table 120 in association with a unique index key associated with the instantiation of server process 110 supplying the data.

In system 100, client process 118 initially discovers an interface supported by server process 110 by issuing a QueryInterface call for that interface to process 110. When the QueryInterface call is successful, a stub object 126 is created in the process 110 and a special proxy object 128 is created process 118. The special proxy object 128 will hereinafter be referred to as an "interceptor object." The process 118 accesses the server process interface whose support was queried by the QueryInterface call via a pointer to the interceptor object 128, which in turn, accesses the server process interface via the pointer returned by the successful QueryInterface call.

Interface 124 includes a method (hereinafter termed the "validate method") which may be called by the object 128 of process 118 to request that process 112 indicate to object 128 of process 118 whether process 112 has determined that process 110 is functioning normally or has failed. For example, if the process 110 fails to respond within a predetermined time period to a call to one of its interface methods by the process 118, the object 128 of process 118 may make a call to the validate method of interface 124, and based upon the response provided to object 128 of process 118 by process 112 to the validate method call, process 118 may take appropriate action (i.e., continue to await response from the process 110, or move on to other processing until the process 112 indicates to the process 118 that process 112 has taken action to correct the failure of the process 118). In response to a call to the validate method of interface 124, process 112 provides the object 128 of process 118 with its current determination as to whether the process 110 is functioning normally. That is, if at the time of the call to the validate method, process 112 has received all expected calls, up to that time, from the process 110 to the notification method of interface 122, process 112 responds to the call to the validate method by returning to the object 128 of process 118 one or more values that indicate that the process 110 is functioning normally. Conversely, if any of the expected calls from the process 110 to the notification method of interface 122 have not been received by process 112, process 112 responds to the call to the validate method by returning to the process 118 one or more other values that indicate that the process 110 has failed.

Once the process 112 has determined that the process 110 is no longer functioning normally, but instead, has failed, process 112 takes corrective action to return the process 110 to a normal operating mode and to an internal state that relatively recently existed prior to the failure of the process 110. Process 112 accomplishes this by first issuing commands to the operating system 114 that cause the operating system 114 to terminate the process 110, and thereafter, to restart the process 110. In response to these commands, the operating system terminates and restarts the process 110.

After the process 112 has provided to the object 128 indication that the process 110 has failed, has restarted the process 110, and has provided indication to the object 128 that the newly instantiated process is operating normally, the object 128 may issue a QueryInterface call to the newly instantiated server process to obtain a new valid pointer to the server process interface whose support had previously been queried by the previous QueryInterface call issued by client process 118.

After process 110 has restarted, the process 112 may also transmit to newly instantiated process 110 (e.g., via an argument in a call to an interface method known to be supported by the process 110) the unique key associated with the internal state data stored in table 120 that is associated with the last preceding instantiation of the process 110. After rediscovering the pointer to the interface 123, process 110 then issues a call, having as an argument the unique key previously supplied to the newly instantiated process 110, to another method supported by that interface 123 to request that the process 112 return to the process 110 the internal state data in table 120 that is associated with the last preceding instantiation of the process 110. In response to this call to interface 123, the process 112 supplies to the process 110 the requested internal state data associated with the unique key. After verifying that the internal state data supplied to it from the process 112 is valid for process 110, the process 110 then modifies the current internal state of process 110 to conform with the data. That is, the current respective values of important program variables, data structures, etc. in process 110 are changed to conform with the respective values therefor in the internal state data supplied from process 112.

The foregoing description has been directed to specific embodiments of the present invention. It will be apparent, however, that other alternatives, variations and modifications may be made to the described embodiments, with the attainment of some or all of their advantages. For example, if appropriately modified in ways apparent to those skilled in the art, process 112 may be used to monitor and correct failure of any number of server processes, and to supply indications of such monitoring and failure, etc. to any number of client processes. Therefore, it is intended that the present invention be viewed as being of broad scope and as covering all such alternatives, modifications, and variations. Thus, it is intended that the present invention be defined only as set forth in the hereinafter appended claims.

What is claimed is:

1. A computerized diagnostic and failure recovery system to execute in a computer, comprising:
    a first computer process that issues a request to a second computer process that the second process monitor the first process for occurrence of a failure condition in operation of the first process;
    a server interface in the second process to interact with the first process to enable the first process to use methods provided in the second process;
    a data table associated with the second process, the first process periodically transferring data representative of the internal state of the first process to the data table;
    the second process initiating, if the second process determines that the failure condition has occurred, corrective action to return the first process to a normal operating mode, the normal operating mode making use of last received data of the data representative of the internal state of the first process; and
    the second process providing to a third computer process an indication as to whether the failure condition has occurred, the first computer process is a server object process and the third process is a client object process of the first process.

2. A system according to claim 1, wherein the corrective action comprises providing the first process with data that enables the first process to change a current internal state of the first process to a normal internal state that existed prior to the occurrence of the failure condition.

3. A system according to claim 1, wherein the corrective action comprises terminating and initiating a restart of the first process, and the second process transmits an identification code to the first process that is associated with an internal state of the first process prior to occurrence of the failure condition.

4. A system according to claim 1, wherein the second process determines the occurrence of the failure condition based at least upon whether the second process has received a message from the first process within a predetermined time period specified in the request.

5. A computerized system, comprising:
    a first computer process that issues a request to a second computer process that the second process monitor the first process for occurrence of a failure condition in operation of the first process; and
    the second process providing to a third computer process an indication as to whether the failure condition has occurred, the first computer process is a server object process and the third process is a client object process to enable the third process to use methods of the first process.

6. A computerized diagnostic and failure recovery method to execute in a computer, comprising:
    issuing a request from a first computer process to a second computer process that the second process monitor the first process for occurrence of a failure condition in operation of the first process;
    establishing a server interface in the second process to interact with the first process to enable the first process to use methods provided in the second process;
    periodically transferring by the first process data representative of the internal state of the first process to a data table in the second process;

initiating by the second process, if the second process determines that the failure condition has occurred, corrective action to return the first process to a normal operating mode, the normal operating mode making use of last received data of the data representative of the internal state of the first process; and providing by the second process, to a third computer process, an indication as to whether the failure condition has occurred, the first computer process is a server object process and the third process is a client object process of the first process.

7. A method according to claim 6, wherein the corrective action comprises providing the first process with data that enables the first process to change a current internal state of the first process to a normal internal state that existed prior to the occurrence of the failure condition.

8. A method according to claim 6, wherein the corrective action comprises terminating and initiating a restart of the first process, and the second process transmits an identification code to the first process that is associated with an internal state of the first process prior to occurrence of the failure condition.

9. A method according to claim 6, wherein the second process determines the occurrence of the failure condition based at least upon whether the second process has received a message from the first process within a predetermined time period specified in the request.

10. A computerized diagnostic and failure recovery method, comprising:

issuing a request from a first computer process to a second computer process that the second process monitor the first process for occurrence of a failure condition in operation of the first process; and the second process providing to a third computer process an indication as to whether the failure condition has occurred, the first process is a server object process and the third process is a client object process to enable the third process to use methods provided in the first process.

11. Computer-readable memory comprising computer-executable program instructions that when executed cause:

issuance of a request from a first computer process to a second computer process that the second process monitor the first process for occurrence of a failure condition in operation of the first process;

establishing a server interface in the second process to interact with the first process to enable the first process to use methods provided in the second process;

periodically transferring by the first process data representative of the internal state of the first process to a data table in the second process;

the second process initiating, if the second process determines that the failure condition has occurred, corrective action to return the first process to a normal operating mode, the normal operating mode making use of last received data of the data representative of the internal state of the first process; and providing by the second process to a third computer process an indication as to whether the failure condition has occurred, the first computer process is a server object process and the third process is a client object process of the first process.

12. Computer-readable memory according to claim 11, wherein the corrective action comprises providing the first process with data that enables the first process to change a current internal state of the first process to a normal internal state that existed prior to the occurrence of the failure condition.

13. Computer-readable memory according to claim 11, wherein the corrective action comprises terminating and initiating a restart of the first process, and the second process transmits an identification code to the first process that is associated with an internal state of the first process prior to occurrence of the failure condition.

14. Computer-readable memory according to claim 11, wherein the second process determines the occurrence of the failure condition based at least upon whether the second process has received a message from the first process within a predetermined time period specified in the request.

15. Computer-readable memory comprising computer-executable program instructions that when executed cause:

issuance of a request from a first computer process to a second computer process that the second process monitor the first process for occurrence of a failure condition in operation of the first process; and the second process providing to a third computer process an indication as to whether the failure condition has occurred, the first process is a server object process and the third process is a client object process to enable the third process to use methods provided in the first process.

16. A method for operating a computer to implement a computerized diagnostic and failure recovery system, comprising:

issuing a request by a first computer process to a second computer process that the second computer process monitor the first process for occurrence of a failure condition in operation of the first process;

establishing a server interface in the second process to enable the first process to use, through the server interface, methods provided in the second process;

transferring periodically by the first process data representative of the internal state of the first process to the second process;

initiating by the second process, if the second process determines that the failure condition has occurred, corrective action to return the first process to a normal operating mode, the normal operating mode making use of last received data by the second process of the data representative of the internal state of the first process; and providing by the second process to a third computer process an indication as to whether the failure condition has occurred, the first computer process is a server object process and the third process is a client object process of the first process.

17. The method as in claim 16, further comprising:

in the step of the second process initiating corrective action by the second process, signaling a third process that the failure has occurred;

taking corrective action by the third process to return the first process to a normal operating mode.

18. The method of claim 16, further comprising:

initiating action to return the first process to a normal operating mode includes halting the first process and restarting the first process.

19. The method of claim 16, further comprising:

determining by the second process that a failure of the first process has occurred by the second process not receiving an expected periodic call from the first process.

20. The method of claim 16, further comprising:

requesting by the first process by a call to the server interface of the second process, after the first process has been restarted after a failure of the first process, the last received data representative of the internal state of the first process.

21. A computer readable media, comprising:

said computer readable media containing instructions for execution on a processor for the practice of the method of claim 6 or claim 10 or claim 16.

22. Electromagnetic signals propagating on a computer network, comprising:

said electromagnetic signals carrying instructions for execution on a processor for the practice of the method of claim 6 or claim 10 or claim 16.

23. A computer comprising:

means for issuing a request by a first computer process to a second computer process that the second computer process monitor the first process for occurrence of a failure condition in operation of the first process;

means for establishing a server interface in the second process to enable the first process to use, through the server interface, methods provided in the second process;

means for transferring periodically by the first process data representative of the internal state of the first process to the second process;

means for initiating by the second process, if the second process determines that the failure condition has occurred, corrective action to return the first process to a normal operating mode, the normal operating mode making use of last received data by the second process of the data representative of the internal state of the first process; and means for providing by the second process to a third computer process an indication as to whether the failure condition has occurred, the first computer process is a server object process and the third process is a client object process of the first process.

24. The apparatus as in claim 23, further comprising:

in the step of the second process initiating corrective action by the second process, means for signaling a third process that the failure has occurred;

means for taking corrective action by the third process to return the first process to a normal operating mode.

25. The apparatus of claim 23, further comprising:

means for initiating action to return the first process to a normal operating mode includes halting the first process and restarting the first process.

26. The apparatus of claim 23, further comprising:

means for determining by the second process that a failure of the first process has occurred by the second process not receiving an expected periodic call from the first process.

27. The apparatus of claim 23, further comprising:

means for requesting by the first process by a call to the server interface of the second process, after the first process has been restarted after a failure of the first process, the last received data representative of the internal state of the first process.

28. A computer comprising:

a first computer process to issue a request to a second computer process that the second computer process monitor the first process for occurrence of a failure condition in operation of the first process, the first computer process establishing a server interface in the second process to enable the first process to use, through the server interface, methods provided in the second process;

data representative of the internal state of the first process periodically transferred by the first process to the second process;

the second process initiating, if the second process determines that the failure condition has occurred, corrective action to return the first process to a normal operating mode, the normal operating mode making use of last received data by the second process of the data representative of the internal state of the first process; and the second process providing to a third computer process an indication as to whether the failure condition has occurred, the first computer process is a server object process and the third process is a client object process of the first process.

29. The apparatus as in claim 28, further comprising:

the second process initiating corrective action by the second process signaling a third process that the failure has occurred;

the third process taking corrective action to return the first process to a normal operating mode.

30. The apparatus of claim 28, further comprising:

the action to return the first process to a normal operating mode includes halting the first process and restarting the first process.

31. The apparatus of claim 28, further comprising:

the second process determining that a failure of the first process has occurred by the second process not receiving an expected periodic call from the first process.

32. The apparatus of claim 28, further comprising:

first process requesting by a call to the server interface of the second process, after the first process has been restarted after a failure of the first process, the last received data representative of the internal state of the first process.

* * * * *